United States Patent [19]

Shimizu

[11] Patent Number: 4,671,371
[45] Date of Patent: Jun. 9, 1987

[54] MOTOR-DRIVEN POWER STEERING SYSTEM

[75] Inventor: Yasuo Shimizu, Tochigi, Japan

[73] Assignee: Honda Giken Kogyo Kabushiki Kaisha, Tokyo, Japan

[21] Appl. No.: 786,040

[22] Filed: Oct. 10, 1985

[30] Foreign Application Priority Data

Oct. 11, 1984 [JP] Japan ................. 59-212910

[51] Int. Cl.[4] .................................. B62D 5/04
[52] U.S. Cl. .................. 180/79.1; 74/388 PS; 180/142
[58] Field of Search ............... 180/79.1, 79.3, 142, 180/141; 74/388 PS

[56] References Cited

U.S. PATENT DOCUMENTS

| | | | |
|---|---|---|---|
| 1,948,487 | 2/1934 | Berry | 180/79.1 |
| 3,229,992 | 1/1966 | Traywick | 180/79.1 |
| 3,659,906 | 5/1972 | Horvath | 180/79.1 |
| 4,176,728 | 12/1979 | Otteblad | 180/79.1 |
| 4,437,531 | 3/1984 | Urabe | 180/79.1 |
| 4,530,413 | 7/1985 | Baike | 180/79.1 |
| 4,570,734 | 2/1986 | Taig | 180/79.1 |

FOREIGN PATENT DOCUMENTS 55-0044058 3/1980 Japan ...................... 180/79.1

*Primary Examiner*—John J. Love
*Assistant Examiner*—Mitchell J. Hill
*Attorney, Agent, or Firm*—Armstrong, Nikaido, Marmelstein & Kubovcik

[57] ABSTRACT

A motor-driven power steering system in a motor vehicle having a body, a steering wheel, and steerable wheels. The power steering system includes a linkage mechanism including tie rods coupled to the steerable wheels and an arm coupled to the tie rods and operatively connecting the steering wheel and the steerable wheels to each other. A torque detector is disposed in the linkage mechanism for detecting the torque applied to the steering wheel and generating a signal indicative of the detected torque. A motor is fixedly mounted on the body and has an output shaft, and the arm is fixed to the output shaft of the motor. The power steering system also has a power supply for energizing the motor and a control circuit responsive to the signal from the torque detector for controlling the torque generated by the motor. Noise and vibration produced by the motor is effectively prevented from being transmitted to the passenger compartment and the steering wheel.

2 Claims, 6 Drawing Figures

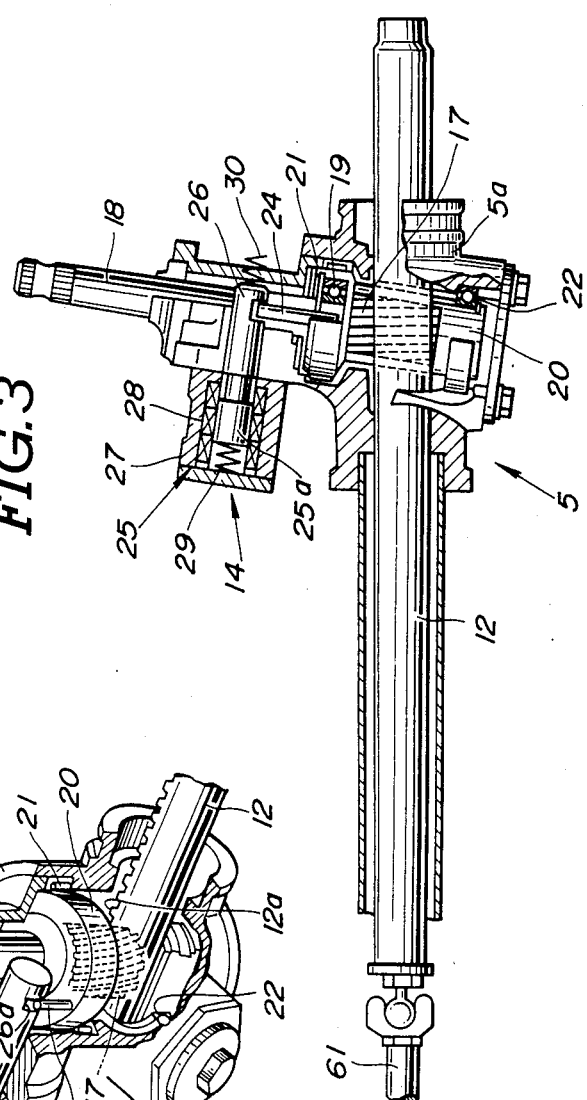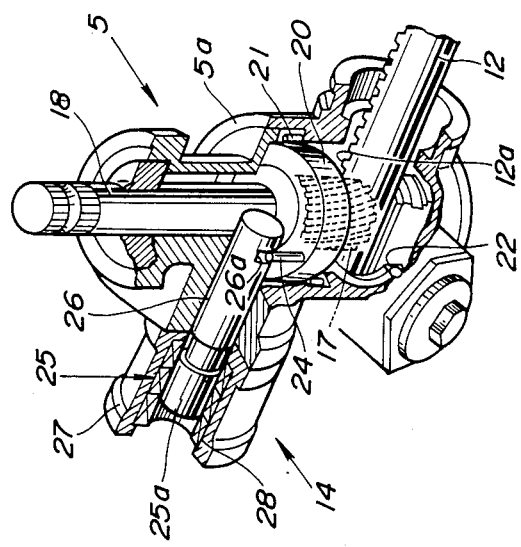

MOTOR-DRIVEN POWER STEERING SYSTEM

BACKGROUND OF THE INVENTION

The present invention relates to a power steering system, and more particularly to a power steering system driven by an electric motor.

Known motor-driven power steering systems are composed of an electric motor for applying assistive power to the linkage of the power steering system to assist in steering operation, a power supply for energizing the electric motor, a detector for detecting the steering torque imposed on the steering wheel and generating a signal representative of the detected steering torque, and a control circuit responsive to the output signal from the detector for controlling the current supplied from the power supply to the motor.

Such conventional motor-driven power steering systems are disclosed in Japanese Laid-Open Utility Model Publication No. 59-68234 and Japanese Laid Open Patent Publication No. 59-50864 (corresponding to U.S. patent application Ser. No. 405,705 filed Aug. 5, 1982), for example. In these prior motor-driven power steering systems, the motor is located near the steering shaft connected to the steering wheel (Japanese Laid-Open Utility Model Publication No. 59-68234), or the motor is disposed directly on the shaft which transmits the rotational torque (Japanese Laid-Open Patent Publication No. 59-50864).

With the above conventional arrangements, however, vibration produced where the motor is energized tends to be transmitted directly to the steering wheel, or noise caused by the motor is apt to enter the passenger compartment of the automobile.

SUMMARY OF THE INVENTION

The present invention has been made in an attempt to eliminate the aforesaid shortcomings of the prior motor-driven power steering systems.

It is an object of the present invention to provide a motor-driven power steering system which effectively prevents motor noise and vibration from being transmitted to the passenger compartment and steering wheel of an automobile in which the motor-driven power steering system is incorporated.

According to the present invention, a motor-driven power steering system in a motor vehicle having a body, a steering wheel, and steerable wheels, includes a linkage means including tie rods coupled to said steerable wheels and an arm coupled to the tie rods and operatively connecting the steering wheel and the steerable wheels to each other. A torque detecting means is disposed in the linkage means for detecting the torque applied to the steering wheel and generating a signal indicative of the detected torque. A motor is fixedly mounted on the body and has an output shaft, and the arm is fixed to the output shaft of the motor. The power steering system also includes a power supply for energizing the motor and a control means responsive to the signal from the torque detecting means for controlling the torque generated by the motor.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 2 is a perspective view, partly cut away, of a gear box in the motor-driven power steering system shown in FIG. 1;

FIG. 3 is a sectional side elevational view of the gear box of FIG. 2;

DETAILED DESCRIPTION OF THE PREFERRED EMBODIMENT

Figure 1:
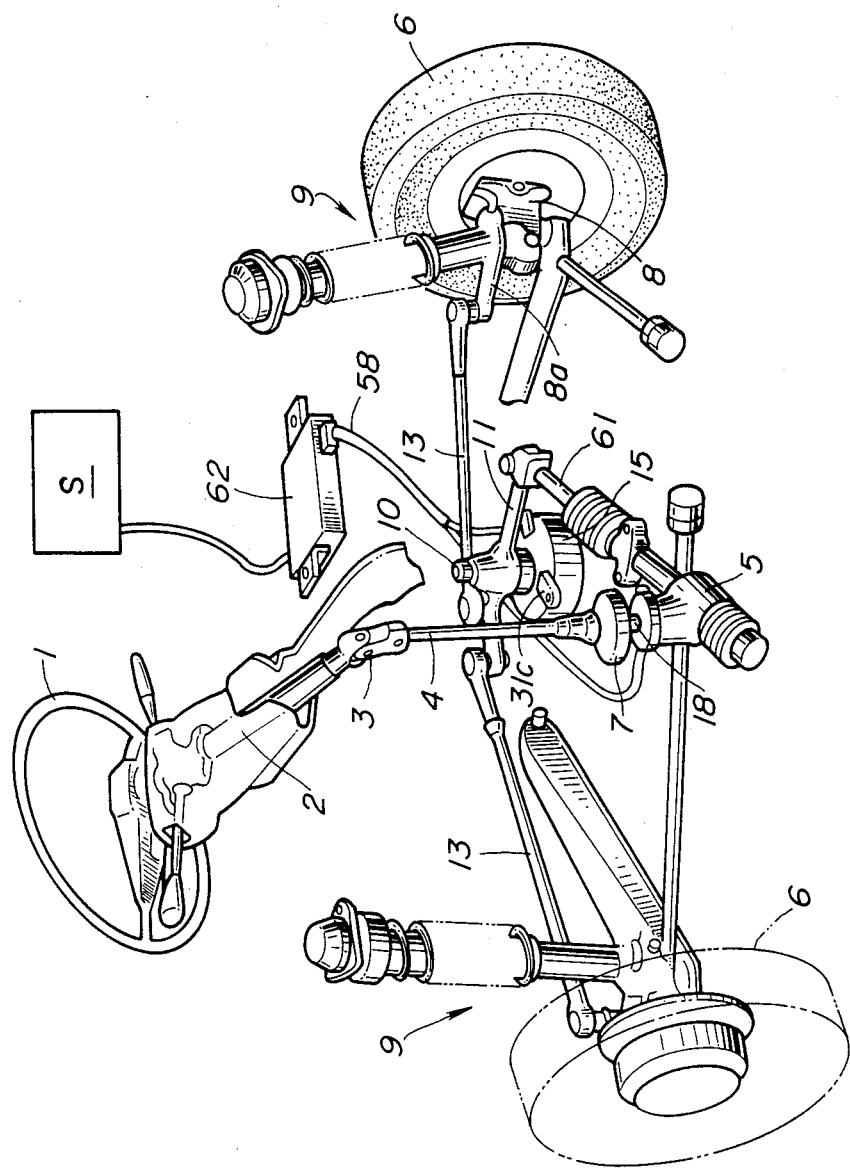
FIG. 1 is a perspective view of a motor-driven power steering system according to an embodiment of the present invention.

FIG. 1 shows a motor-driven power steering system according to the present invention. The motor-driven power steering system has a steering column 2 fixed to an automobile body (not shown) with a steering shaft (not shown) being rotatably supported in the steering column 2. A steering wheel 1 is coupled to one end of the steering shaft. Although the automobile body is omitted from illustration in FIG. 1 for the purpose of clearly showing the components of the power steering system, some of the components are fixed to or supported on the automobile body, as described later on. The other end of the steering shaft is coupled through a joint 3 to the upper end of a vertical shaft 4, the lower end of which is coupled by a joint 7 to the upper end of a shaft 18 projecting from a gear box 5 fixed to the automobile body. The steering torque manually applied to the steering wheel 1 is transmitted smoothly to a shaft 18 of the gear box 5.

A pair of front wheels 6 is carried on respective knuckles 8 which are steerably supported on the automobile body by means of a pair of respective suspensions 9. Each of the knuckles 8 has a knuckle arm 8a with its distal end pivotally coupled to the outer end of a tie rod 13.

An electric motor 15 is fixed to the automobile body in substantial alignment with the axial center line of the automobile body and has a vertical output shaft 10. A center arm 11 attached at its center to the output shaft 10 extends substantially longitudinally along the automobile body. The center arm 11 has a front end coupled by a drag link 61 to one end of a rack shaft 12 (FIG. 3) slidably disposed in the gear box 5, a bifurcated rear end coupled to the inner ends of the tie rods 13, and a central portion fixed to the output shaft 10 of the motor 15. The above rods, arm, and link thus coupled together jointly constitute a center-arm-type steering linkage.

The motor-driven power steering system of the invention also has a torque detector 14 (FIG. 3) coupled to the gear box 5. An output signal generated by the torque detector 14 is fed through a cord 58 (FIG. 1) to a control circuit 16 (FIG. 5) housed in a box 62. The control circuit 16 processes the supplied signal to control a current supplied to the motor 15 for controlling the torque generated thereby. The current is supplied via the control circuit 16 to the motor 15 from a power supply or source S.

Figure 4:
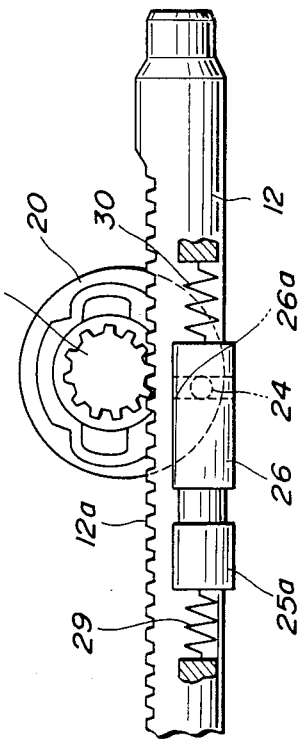
FIG. 4 is a schematic plan view of the geometry of parts in the gear box illustrated in FIGS. 2 and 3.

The gear box 5 and the torque detector 14 will be described below in greater detail with reference to FIGS. 2 through 4.

The gear box 5 has a housing 5a fixed to the automobile body. The rack shaft 12 which extends substantially horizontally is axially slidably supported in the housing 5a. A pinion holder 20 is rotatably supported by bearings 21, 22 in the housing 5a and has its rotational axis extending substantially vertically (or slightly obliquely). The pinion holder 20 has an off-center hole disposed eccentrically with respect to the rotational axis thereof. A pinion shaft 18 is rotatably supported in the off-center hole of the pinion holder 20 by means of a bearing 19. The pinion shaft 18 has on its lower end a pinion 17 held in mesh with the rack 12a of the rack shaft 12. The pinion shaft 18 has an axis extending parallel to the rotational axis of the pinion holder 20 and deviated therefrom in a direction away from the rack 12a. The housing 5a includes a cylindrical casing 27 accommodating therein a differential transformer 25 and an axially slidable slider 26 supporting the moving core 25a of the differential transformer 25 on one end thereof and having an engagement slot 26a defined in the other end thereof. The slider 26 is normally urged to its central position by two coil springs 29, 30 provided on the opposite ends thereof. The pinion holder 20 has a pin 24 (FIG. 4) spaced widely from the rotational axis thereof and engaging in the engagement slot 26a in the slider 26.

The upper end of the pinion shaft 18 projects out of the housing 5a and is connected by the joint 7 to the vertical shaft 4, as described above.

Figure 5:
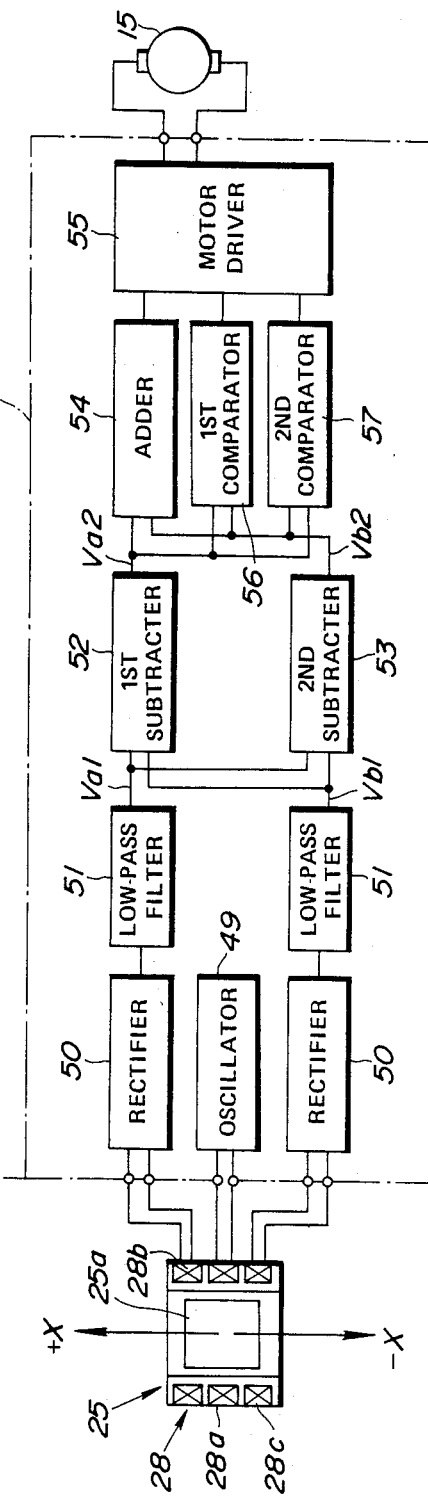
FIG. 5 is a block diagram of a control circuit employed in the power steering system of FIG. 1.

The differential transformer 25 has a coil 28 fixedly mounted in the cylindrical casing 27. As illustrated in FIG. 5, the coil 28 is composed of a primary winding 28a and a pair of secondary windings 28b, 28c disposed one on each side of the primary winding 28a and having the same dimensions. The moving core 25a is movably disposed in the coil 28.

When a rotational torque is applied from the steering wheel 1 to the pinion shaft 18, the pinion 17 pushes the rack shaft 12 in one axial direction thereof and is pushed in the opposite direction under a reactive force which is equal in magnitude to the force with which the rack shaft 12 is pushed in said one axial direction. These pushing and reactive forces are substantially proportional to the magnitude of the rotational torque applied to the pinion shaft 18.

Under the reactive force imposed on the pinion 17, the pinion holder 20 is angularly moved about its own axis to cause the pin 24 thereon to displace the slider 26 axially with respect to the cylindrical casing 27. As the slider 26 is axially displaced a larger interval, the force applied by the springs 29, 30 to the slider 26 is increased progressively. The pinion holder 20 is stopped in a position in which the force tending to rotate the pinion holder 20 based on the reactive force applied from the rack shaft 12 to the pinion 17 is equal to the force tending to rotate the pinion holder 20 based on the resilient force applied by the springs 29, 30 from the slider 26 to the pin 24 on the pinion holder 20. Therefore, the extent of displacement of the slider 26 with respect to the housing 5a is dependent on the magnitude of the rotational torque transmitted from the steering wheel 1 to the pinion shaft 18. The direction and magnitude of the displacement of the slider 26 is converted by the differential transformer 25 into an electric signal which is representative of the direction and magnitude of the steering torque imposed on the steering wheel 1.

The structure and operation of the control circuit 16 will be described with reference to FIG. 5. When the steering wheel is rotated clockwise and counterclockwise, the moving core 25a of the differential transformer 25 is displaced in the directions +X and −X, respectively. An AC voltage is applied from an oscillator 49 to the primary winding 28a to induce voltages across the secondary windings 28b, 28c. The magnitudes of the induced voltages are dependent on the position of the moving core 25a in the coil 28. When the moving core 25a is in its central position, the voltages induced across the secondary windings 28b, 28c are equal to each other. Currents flowing through the secondary windings 28b, 28c are rectified and smoothed by respective rectifiers 50 and lowpass filters 51 which issue output signals Va1, Vb1 to first and second subtracters 52, 53, respectively. The first and second subtracters 52, 53 process the applied signals to produce differences between these signals. More specifically, the first subtracter 52 generates an output signal Va2 equal to Va1−Vb1, and the second subtracter 53 generates an output signal Vb2 equal to Vb1−Va1. Suitable bias voltages are applied to components of the subtracters 52, 53 such that the output signals from the substracters 52, 53 will be of a zero value if the signal differences are negative. As a result, the output signal Va2 of the first subtracter 52 is proportional to the magnitude of the steering torque at the time the steering wheel is turned clockwise, and coversely, the output signal Vb2 of the second subtracter 53 is proportional to the magnitude of the steering torque at the time the steering wheel is turned counterclockwise.

The output signals Va2, Vb2 are added by an adder 54 which applies a signal to a motor driver 55 for controlling the armature current of the motor 15. The output signals Va2, Vb2 are also applied to first and second comparators 56, 57 which compare the magnitudes of the output signals Va2, Vb2 for detecting the direction in which the steering wheel is steered. More specifically, the steering torque is produced clockwise when Va2>Vb2 and the output of the first comparator 56 is high, and the steering torque is produced counterclockwise when Vb2>Va2 and the output of the second comparator 57 is high. When the outputs from the first and second comparators 56, 57 are low at the same time, the steering wheel is not steered. The output signals from the first and second comparators 56, 57 are applied to the motor driver 55 as signals for determining the direction in which the armature current is to flow.

Therefore, the magnitude and direction of the assistive torque generated by the motor 15 can be controlled by the output signals from the adder 54 and the comparators 56, 57 dependent on the magnitude and direction of the steering torque exerted to the steering wheel.

Figure 6:
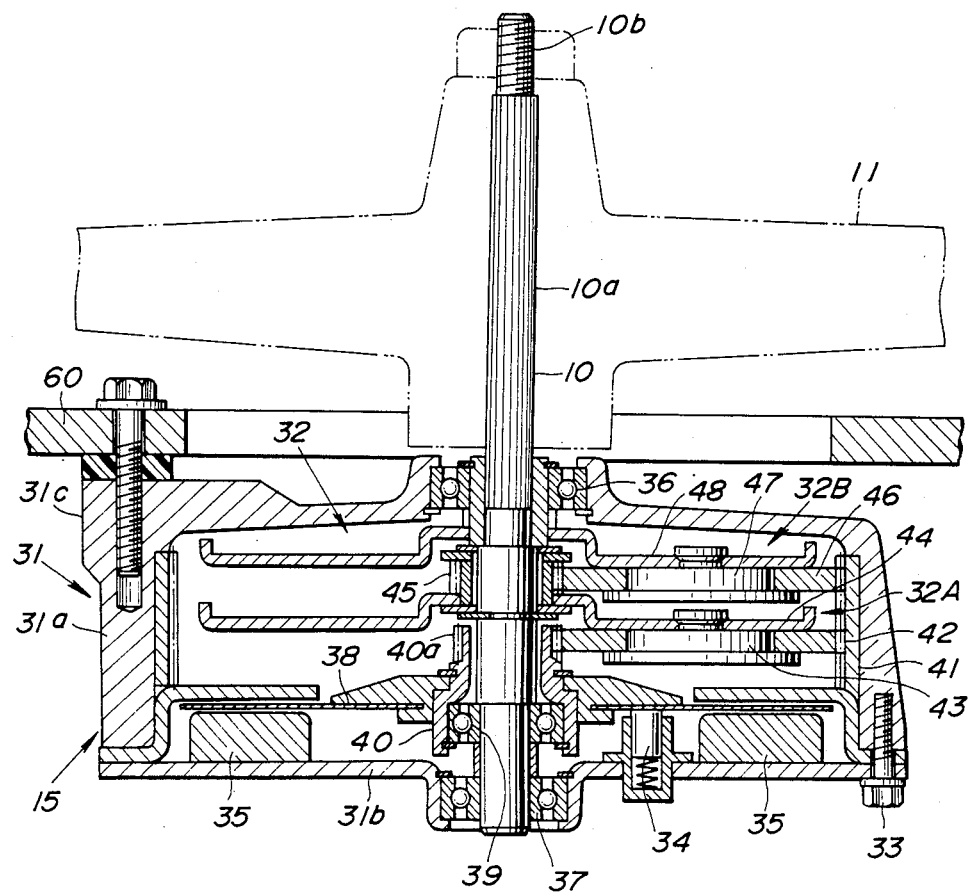
FIG. 6 is an enlarged vertical cross-sectional view of a motor in the power steering system of FIG. 1.

FIG. 6 shows the internal construction of the motor 15. The motor 15 has a case 31 having integral arms 31c fixed to the automobile body, denoted 60, by bolts with rubber pieces therebetween. The motor 15 is of an axially flat design which may comprise such as a disc-shaped printed-coil motor, as shown, having an armature comprising a spiral conductor printed on a thin insulating board 38.

The case 31 is composed of a body 31a having an open bottom accommodating therein the motor components and a speed reducer 32, and a bottom plate 31b fastened to the body 31a by bolts 33 and having magnets 35. The output shaft 10 of the motor 15 projects upwardly through a central opening in the body 31a and is rotatably supported by a bearing 36 mounted on the body 31a and a bearing 37 mounted on the bottom plate 31b.

The armature board 38 is disposed close to the magnets 35 and supported by a bearing 39 on the output shaft 10 for rotation with respect to the output shaft 10, the bearing 39 being retained in a tubular shaft 40 mounted centrally in the armature board 38.

The speed reducer 32 is composed of two planetary gear mechanisms 32A, 32B sharing an internal gear 41 fixed to the inner peripheral surface of the case body 31a. The first planetary gear mechanism 32A includes a sun gear 40a defined on the outer circumference of the tubular shaft 40 of the armature board 38, planet gears 42 held in mesh with the sun gear 40a and the internal gear 41, and a first carrier 44 on which the planet gears 42 are rotatably mounted by respective shafts 43 and which are rotatably supported on the output shaft 10. Similarly, the second planetary gear mechanism 32B includes a sun gear 45 defined on the outer circumference of a tubular shaft of the first carrier 44, planet gears 46 held in mesh with the sun gear 45 and the internal gear 41, and a second carrier 44 on which the planet gears 46 are rotatably mounted by respective shafts 47 and which are rotatably supported on the output shaft 10.

The output shaft 10 has serrations 10a defined on an upper portion thereof and an externally threaded upper end 10b, and is fixed to the center arm 11 by the serrations 10a and the externally threaded upper end 10b.

In operation, when the steering wheel 1 is turned, its rotary motion is transmitted through the steering shaft and the vertical shaft 4 to the rack-and-pinion mechanism in the gear box 5 for causing the pinion 17 to push the rack shaft 12 axially. The torque detector 14 attached to the gear box 5 detects the direction and magnitude of the rotational torque and transmits signals indicative of the torque direction and magnitude to the control circuit 16.

The motion of the rack shaft 12 is also transmitted through the center arm 11 to the tie rods 13 to swing the same to reach a certain steering angle. At the same time, the signals bearing information representing the torque direction and magnitude are processed by the control circuit 16, which supplies control signals to the motor driver 55. The motor 15 then generates an assistive torque dependent on the direction and magnitude of the torque applied to the steering wheel 1 for assisting in rotating the center arm 11.

With the foregoing arrangement, the motor 15 is fixed to the automobile body 60 such that the output shaft 10 thereof supports the center arm 11, the motor 15 itself being located outside of the automobile passenger compartment. The assistive torque produced by the motor 15 is applied to the center arm 11 for assisting the same in making angular movement. Therefore, noise produced by the motor 15 is not appreciably transmitted to the passenger's compartment, and vibration caused by the motor 15 upon energization thereof is not applied to the steering wheel 1 since the motor 15 serves to turn the center arm 11 and is located remotely from the steering wheel 1.

Inasmuch as the motor 15 is of a flat configuration such as a disc-shaped printed-coil motor having small axial dimensions, the motor 15 can be installed with ease, is small in size, and is highly responsive in the generation of assistive torques. The motor-driven power steering system of the invention is made of a reduced number of parts and can be manufactured inexpensively since no special power transmission member is required to be interposed between the motor 15 and the center arm 11.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A motor-driven power steering system in a motor vehicle having a body, a steering wheel, steerable wheels, comprising:

a steering shaft rotating in unison with said steering wheel;

a drag link operatively coupled to said steering shaft to move in the axial direction thereof;

coupling means for coupling said steering shaft with said drag link and converting rotational movement of said steering shaft to linear movement of said drag link;

tie rods having one end coupled to said steerable wheels;

a motor mounted on said body and having an output shaft;

a center arm having one end coupled to said drag link and the other end coupled to said tie rods, and fixed at its center to said output shaft of said motor;

torque detecting means disposed in said coupling means for detecting the torque applied to said steering wheel and generating a signal indicative of the detected torque;

a power supply for energizing said motor; and control means responsive to said signal from said torque detecting means for controlling the torque generated by said motor.

2. A motor-driven power steering system according to claim 1, wherein said motor comprises an axially flat motor, said output shaft of said motor extending substantially vertically, said center arm being fixed to an upper end of said output shaft and extending substantially horizontally.

* * * * *